Sept. 28, 1954     R. W. KING     2,690,141

RAILWAY ROLLING STOCK

Filed Sept. 26, 1946     2 Sheets-Sheet 1

INVENTOR
R. W. King
BY
John McHose
ATTORNEY

Sept. 28, 1954
R. W. KING
2,690,141
RAILWAY ROLLING STOCK
Filed Sept. 26, 1946
2 Sheets-Sheet 2
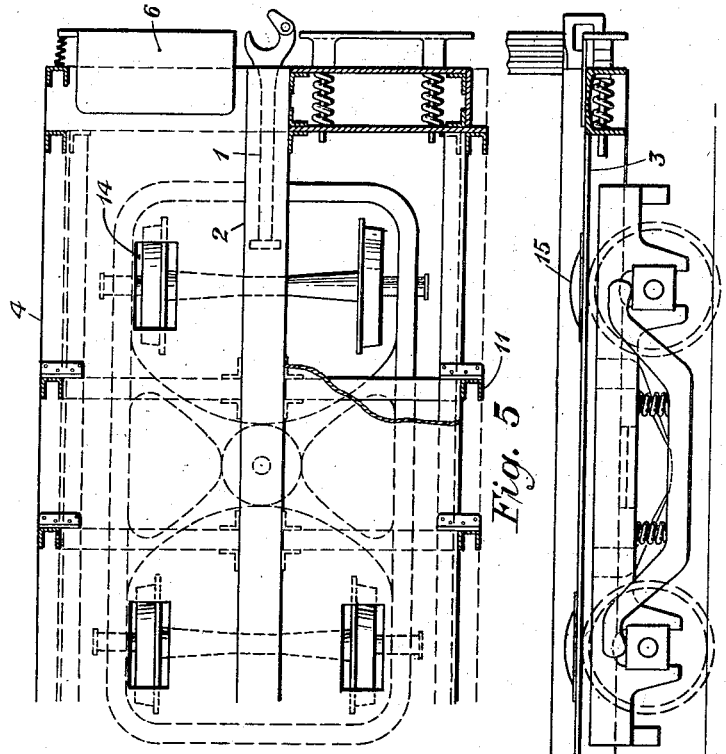
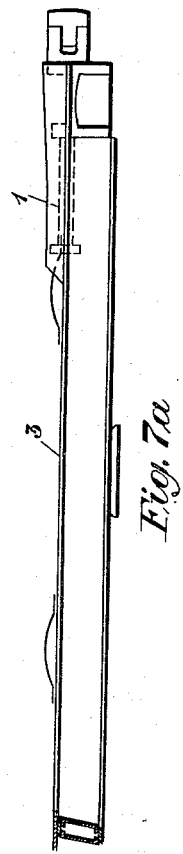
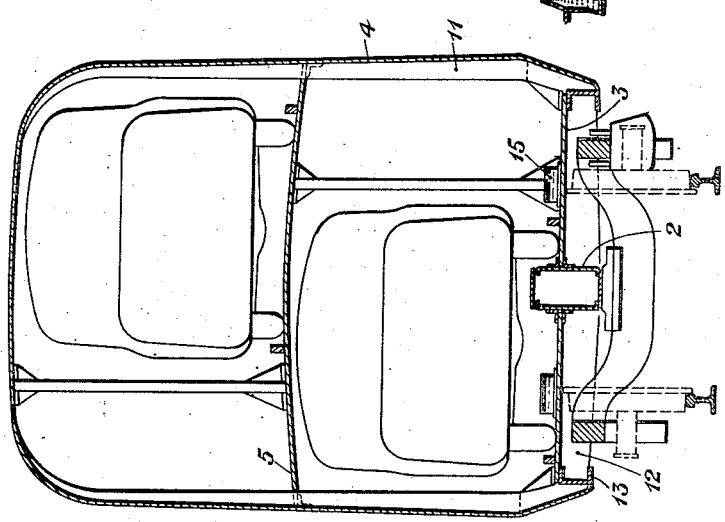
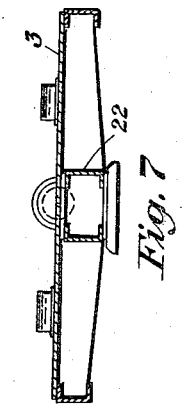
INVENTOR
R. W. King
BY
ATTORNEY Patented Sept. 28, 1954

2,690,141

UNITED STATES PATENT OFFICE 2,690,141

RAILWAY ROLLING STOCK

Robert Waldo King, Scarsdale, N. Y.

Application September 26, 1946, Serial No. 699,507

5 Claims. (Cl. 105—340)

This invention relates to a system for transporting motor vehicles and their passengers by railroad trains, and particularly to novel types of railroad cars characterized by means to facilitate the loading and the unloading of the said vehicles and their passengers, and to provide suitable protection to the said vehicles and passengers in transit.

This application is for an improvement in the invention disclosed in my Patent No. 2,211,469 which issued August 13, 1940, and which shows a type of railway vehicle having two compartments, one above the other, the lower one being designed for motor vehicles and the upper one being intended to provide either seats or berths for the passengers, or dining facilities, or as a runway for additional motor vehicles functioning in the same fashion as the lower runway. The invention, covered by the present application, resides in such a double-deck railway car for the carrying of motor vehicles, characterized by having flat decks extending from end to end of the car, such as will permit of the ready loading and unloading of passenger automobiles under their own power, although the car as a whole will remain within standard railroad clearances.

Figure 1:
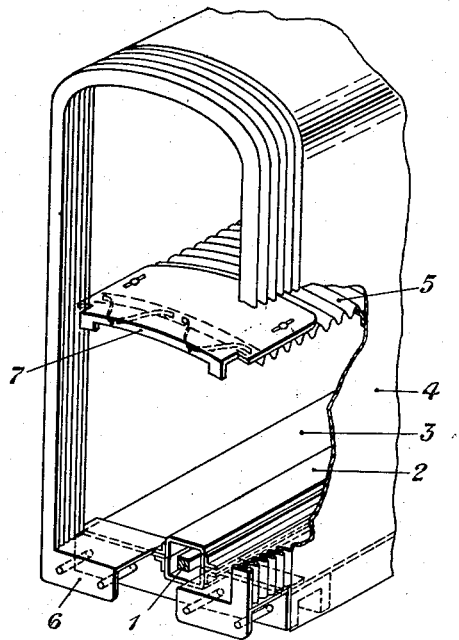
Figure 2:
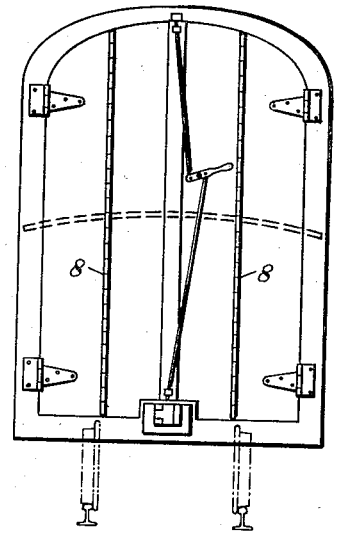
Figure 3:
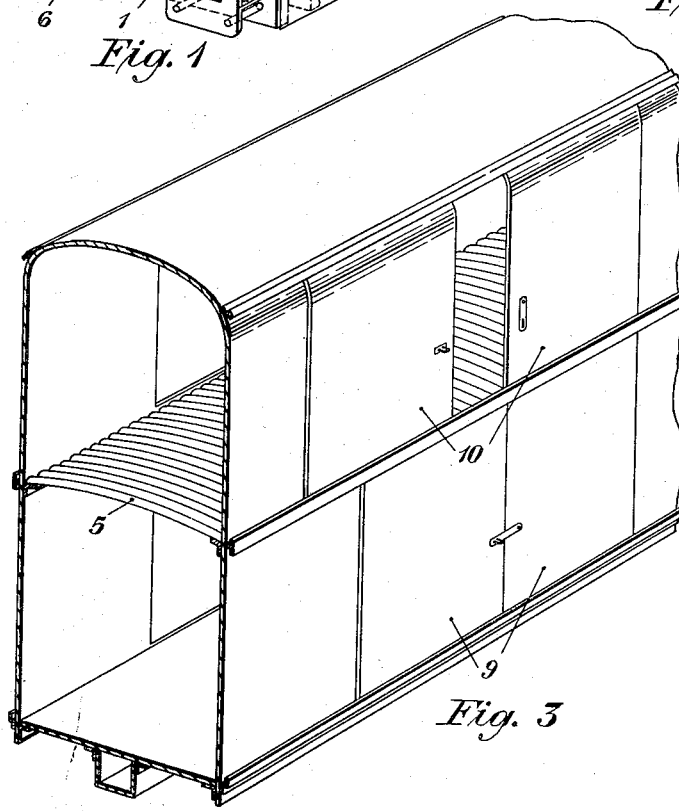

Other objects of this invention will be apparent from the following description, when read in connection with the attached drawings, of which Fig. 1 shows, in perspective, a view of one end of a vehicle in which one form of the invention is embodied; Figs. 2 and 3 show the manner in which side doors and end doors may be applied to such vehicles; Fig. 4 is a cross-sectional view showing, in greater detail, the manner in which the side walls are supported and also the mode of attaching the framework to the trucks of the car; Fig. 5 is a plan view and Fig. 6 a side view of the type of truck shown in Fig. 4; and Figs. 7 and 7a show the form of the invention in which the center sill member is placed beneath the floor level throughout substantially its entire length except for the housing at each end to enclose the draft gear.

The unalterable dimensions in all standard railroad equipment are the gauge of the track and the height of the coupler above the top of the rail. This latter must not vary by more than plus-or-minus one inch or so. For present purposes it will be accurate enough to stipulate that the vertical distance from the rail top to the coupler is forty inches. Furthermore, all standard passenger automobiles possess a road clearance of at least six inches. This permits placing the lower runway of a freight-car, in which this invention is embodied, six inches below the top of the coupler and therefore thirty-four inches above the rail level. Figs. 1, 4, 5 and 6 show such an arrangement in detail. The position of the draft gear is indicated at 1. Surrounding this and running the length of the car from one end sill to the other is a columnar steel center sill structure 2 which is so proportioned as to give adequate supporting and buffing strength to the car. At a level about six inches below the top of the coupler and an equal distance below the upper surface of the column or center sill member 2 the floor, which consists of steel plates or other suitable material, joins member 2. Crossbeams 12 and end sills 13 attached to the lower portion of column 2 support the floor and superstructure.

As shown in Figs. 1, 2, 3 and 4, the superstructure of the railroad car may be of inverted U-shape section, extending uniformly between the end sills. It consists preferably of a thin metal envelope 4 supported by adequate ribs 11 which, in turn, are rigidly attached to the crossbeams 12 projecting from the center sill 2. In order to economize on head room the upper deck 5 may consist, as shown, of a corrugated metal plate to which a small degree of crowning has been imparted. The over-all thickness of such a deck need not exceed two to three inches.

Account may be taken now of the vertical dimensions of such a car. The present-day passenger automobile never exceeds six feet in over-all height, and usually is two to six inches less. Adding successively thirty-four inches as the height of the car floor above the rail, seventy-five inches as the clearance between this floor and the upper deck, three inches for the thickness of the deck, another seventy-five inches for the clearance between the upper deck and the ceiling of the car, and another three inches for the thickness of the ceiling totals one hundred ninety inches or fifteen feet ten inches—a figure which is well within the clearance limits of practically all railroads. Employment of what may be termed a drop-frame truck, as shown in Figs. 4, 5 and 6, further facilitates the desired disposition of the two decks of the car, as mentioned hereinbefore, permitting as it does the use of car wheels of a standard size. The term drop-frame denotes that the transverse members of each truck frame are depressed somewhat throughout their central portions, giving them in elevation a gentle U shape, and thereby lowering the level of the bolster and king pin with respect to the rails.

Entrances to the car just described may be arranged in any one of several forms. Fig. 1 illustrates a flexible vestibule construction with spring buffer plates 6 and 7 for the lower deck and for the upper deck, respectively, so that two continuous runways are formed throughout whatever number of cars of this type are coupled together. Fig. 2 shows a car of the type just described which is equipped with a pair of end doors. These end doors may be hinged longitudinally along their midlines, as shown at 8, so as to permit of opening within the limited space available when two cars are coupled together. Fig. 3 shows a section of car equipped with two pairs of laterally placed sliding doors of the type commonly employed in box cars, one pair 9 for the lower deck and another 10 for the upper deck. A similar set of doors might, of course, be placed on the opposite side of the car, or a single pair of doors might be used on each side, these doors being high enough to give entrance to both decks.

When using side doors it will be undesirable, of course, to have the center sill of the car project above the lower deck, and in such instances the type of frame detailed in Figs. 3, 7 and 7a may be employed.

The lower deck may appropriately be slotted as shown by 14 and the slots fitted with caps 15 to prevent interference with the wheels.

As passengers may occasionally wish to climb from the lower deck to the upper deck or vice versa, the front and rear cars of a train might provide stairways or ladders, these being attached for example to the swinging doors which close the front and rear ends respectively of these two cars. Narrow doors, sliding or hinged, may likewise be provided in the side walls to accommodate entrance and exit of passengers.

Although this invention has been disclosed as embodied in particular forms and arrangements of parts, it is capable of embodiment in other and different forms without departing from the spirit and scope of the appended claims.

What is claimed is:

1. In combination, a drop-frame truck and a railroad car frame consisting of end sills and lateral beams connected by a columnar structure which at its ends houses the draft gear, the laterally projecting beams and end sills supporting a floor which throughout the length of the car is substantially at the level of the wheel tops and below the level of the top of the couplers.

2. A railroad car as in claim No. 1, which possesses side walls and a roof and an upper deck, and each end of which terminates with a flexible vestibule section to effect free passage of automobiles and/or passengers from car to car along either deck.

3. A railroad car designed for the transportation of automobiles, comprising, in combination, a car frame and a truck frame, said car frame consisting of end sills and lateral beams connected by a columnar structure which houses the draft gear, the laterally projecting beams and end sills supporting a floor which throughout the entire length of the car is at a level below that of the top of the couplers.

4. A railroad car with a frame as in claim 3, and possessing side walls and a roof and a deck, and each end of which terminates with a flexible vestibule section to effect free passage of automobiles and/or passengers from car to car along either deck.

5. A railroad car for the transportation of automobiles and/or passengers, having two decks, the lower of which is mounted upon a frame connected to and supported by a columnar center sill, the said lower deck throughout the entire length of said car being at a level below the top of the couplers.

References Cited in the file of this patent

UNITED STATES PATENTS

| Number | Name | Date |
|---|---|---|
| 799,606 | Lindenthal | Sept. 12, 1905 |
| 1,211,789 | Thompson | Jan. 9, 1917 |
| 1,663,036 | Ashe et al. | Mar. 20, 1928 |
| 1,733,015 | Hicken | Oct. 22, 1929 |
| 1,981,714 | Yost | Nov. 20, 1934 |
| 1,985,711 | Ayers et al. | Dec. 25, 1934 |
| 1,994,695 | Dolan et al. | Mar. 19, 1935 |
| 2,088,655 | King | Aug. 3, 1937 |
| 2,208,679 | McCarroll | July 23, 1940 |
| 2,211,469 | King | Aug. 13, 1940 |
| 2,241,377 | Clemens | May 13, 1941 |
| 2,315,118 | Greener | Mar. 30, 1943 |
| 2,405,136 | Dittrich | Aug. 6, 1946 |
| 2,434,001 | Sheesley | July 15, 1947 |